UNITED STATES PATENT OFFICE.

HENRY C. GIBSON, OF CAMDEN, NEW JERSEY.

IMPROVED FABRIC FOR THE MANUFACTURE OF ENAMELED COLLARS, CUFFS, &c.

Specification forming part of Letters Patent No. 43,489, dated July 12, 1864.

*To all whom it may concern:*

Be it known that I, HENRY C. GIBSON, of the city of Camden, in the county of Camden and State of New Jersey, have invented a new combination of material designed for and to be used in the manufacture of gentlemen's and ladies' enameled textile collars and wristbands; and I do hereby declare that the following is a full and exact description thereof.

The nature of my invention consists in the preparation of cotton or linen cloth, or its equivalent, to be used as a substitute for steel or other metal in the manufacture of shirt-collars and wristbands and ladies' collars, cuffs, &c.

To enable others to make use of my invention, I herewith submit the mode of preparation and the articles used.

The process consists in uniting together, by means of cement or water-proof paste, two or more layers of cotton or linen cloth, or its equivalent, by spreading the cement on each layer separately, then pressing them together by passing them through iron rollers. The material thus united is dried, afterward cut into the desired shapes, when thin coatings of white paint is applied with a brush. This paint is mixed in the ordinary way using spirits of turpentine, or its equivalent, in place of linseed-oil. After a sufficient quantity of paint or enamel has been applied a smooth surface is obtained by rubbing with pumice-stone.

The component parts of the cement or water-proof paste are as follows: Wheat flour, twelve ounces; white glue, four ounces; rosin, two ounces; water, two quarts, or sufficient to incorporate the whole by boiling into a thin paste or cement.

The novelty of my invention consists in the use of cloth thus and similarly prepared in the manufacture of gentlemen's enameled shirt-collars and wristbands and ladies' collars and cuffs, &c., as a substitute for steel or other metal.

I do not claim the invention of enameled shirt-collars, &c.; nor the composition composing the enamel or paint used; but What I do claim, and wish to secure by Letters Patent, is—

The material substantially as set forth, and its exclusive use in the manufacture of enameled shirt-collars and similar articles of dress.

HENRY C. GIBSON.

Witnesses:
N. C. BURCH,
D. W. PEABODY.